Dec. 12, 1933.     B. F. IRWIN ET AL     1,939,054
APPARATUS FOR TREATING ARTICLES
Original Filed July 21, 1930     7 Sheets-Sheet 3
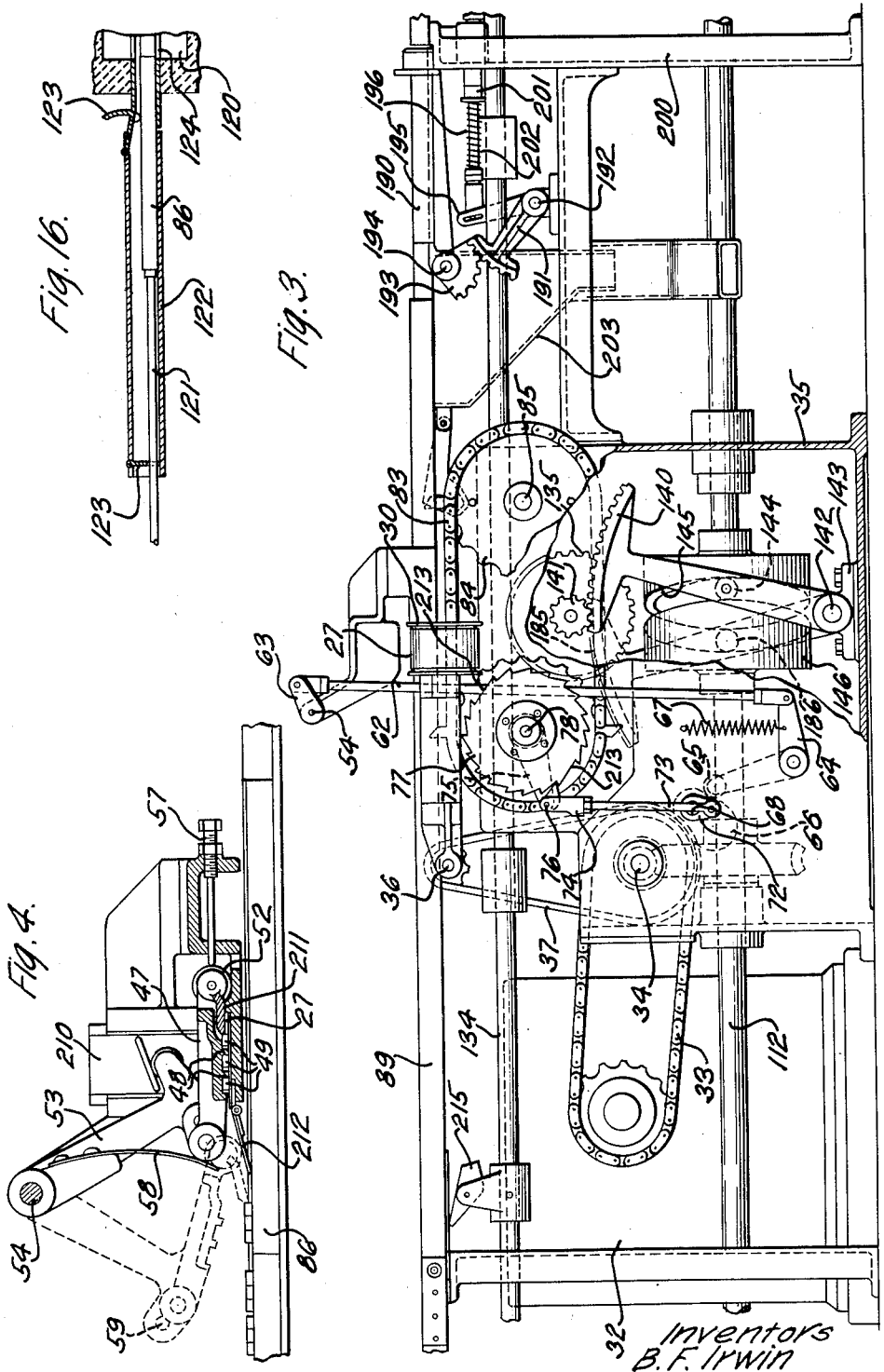
Inventors
B. F. Irwin
H. T. Tornberg
By H. B. Whitfield Atty.

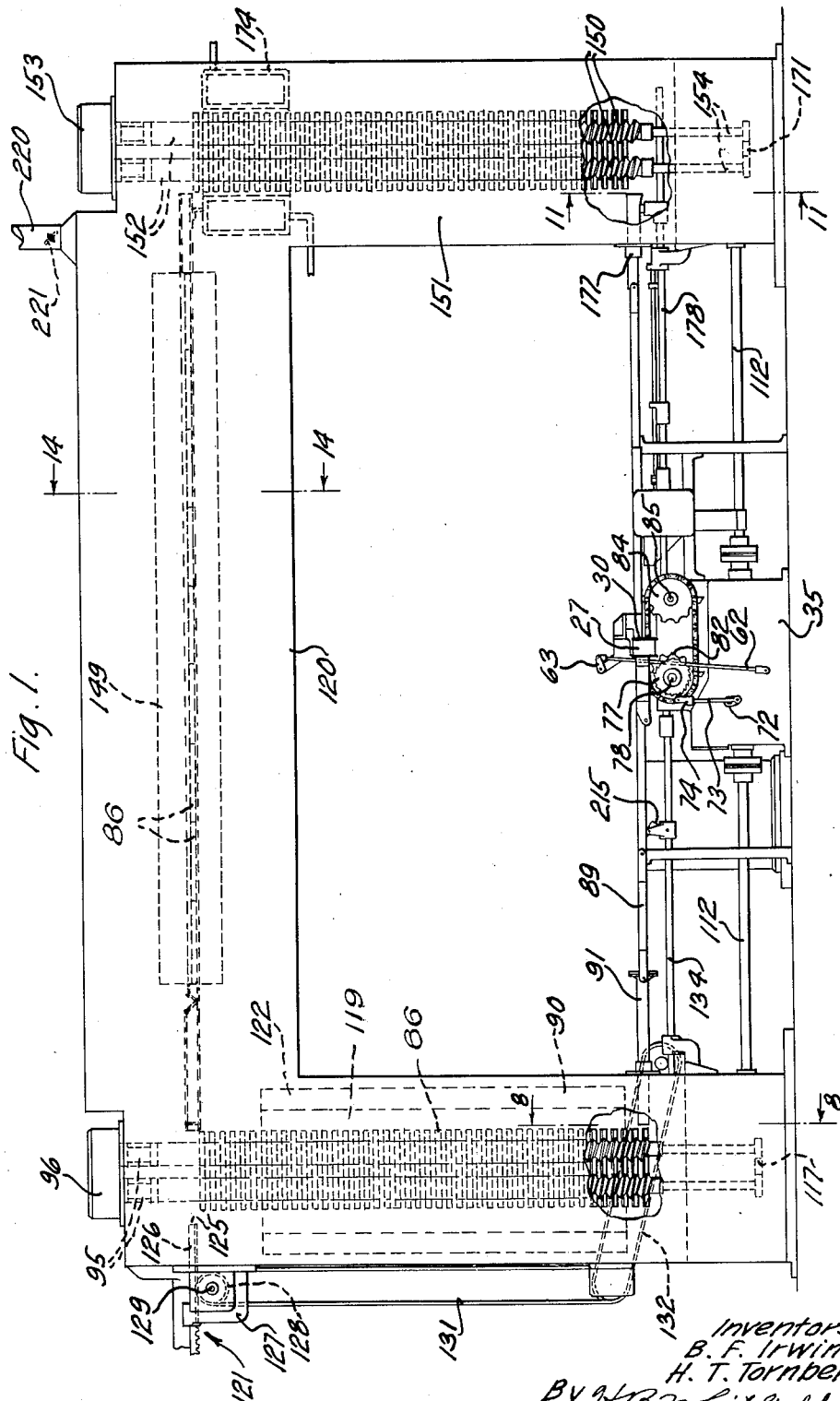

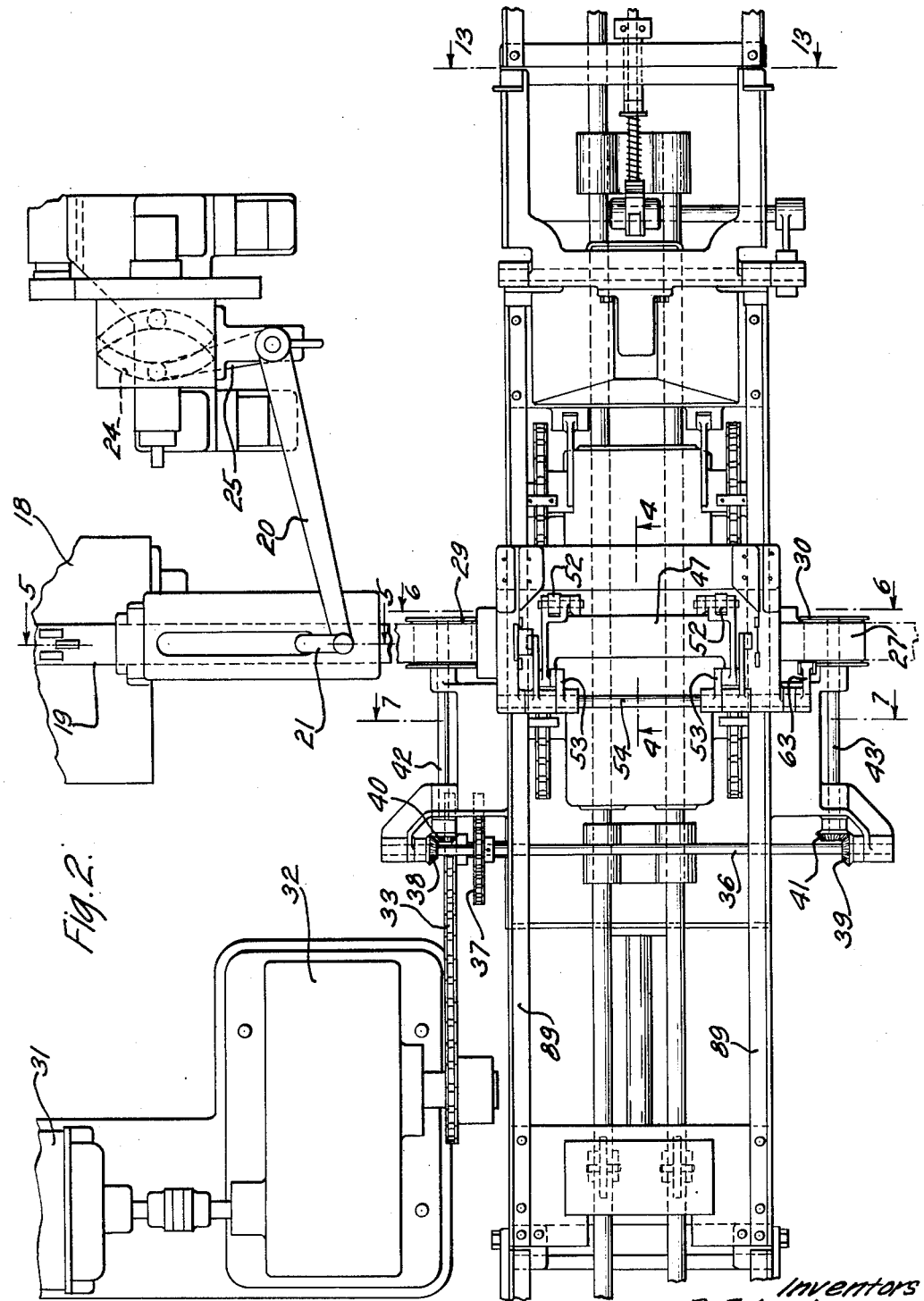

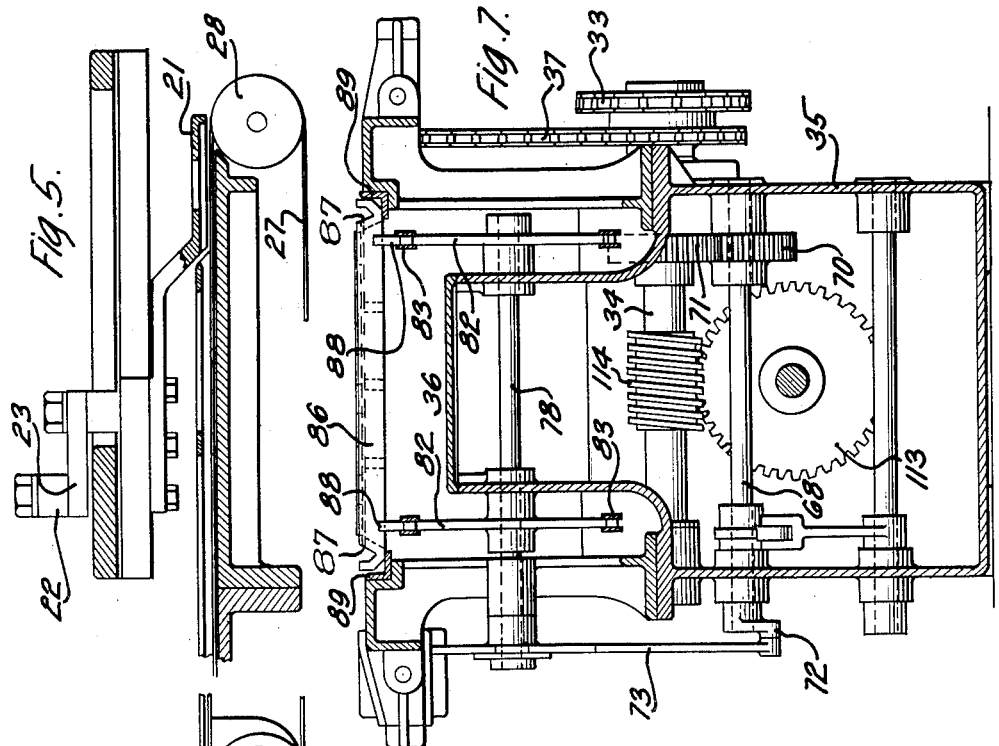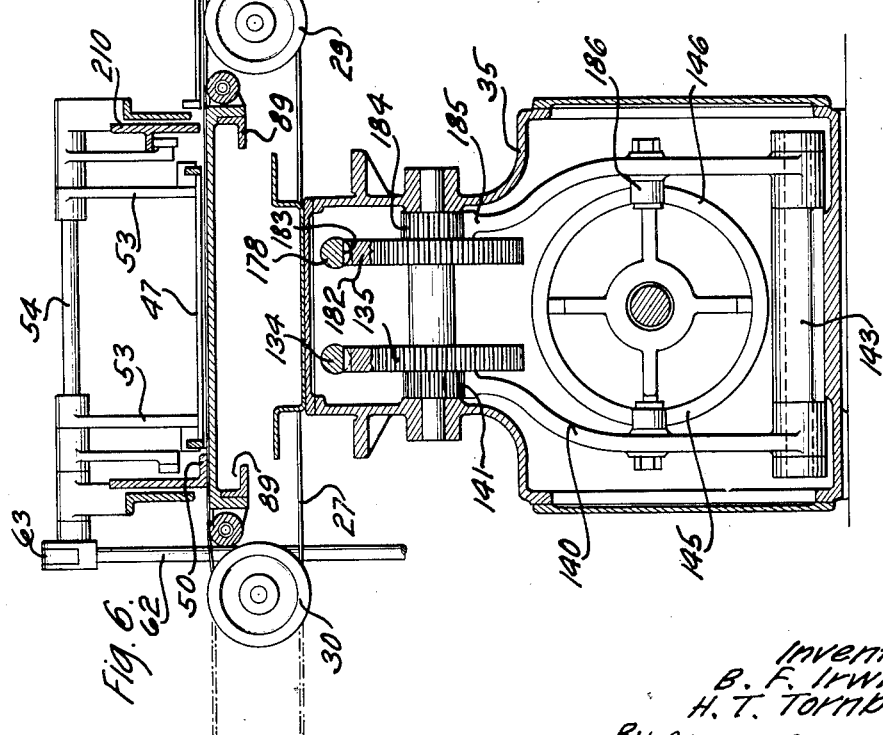

Dec. 12, 1933.     B. F. IRWIN ET AL     1,939,054
APPARATUS FOR TREATING ARTICLES
Original Filed July 21, 1930     7 Sheets-Sheet 5
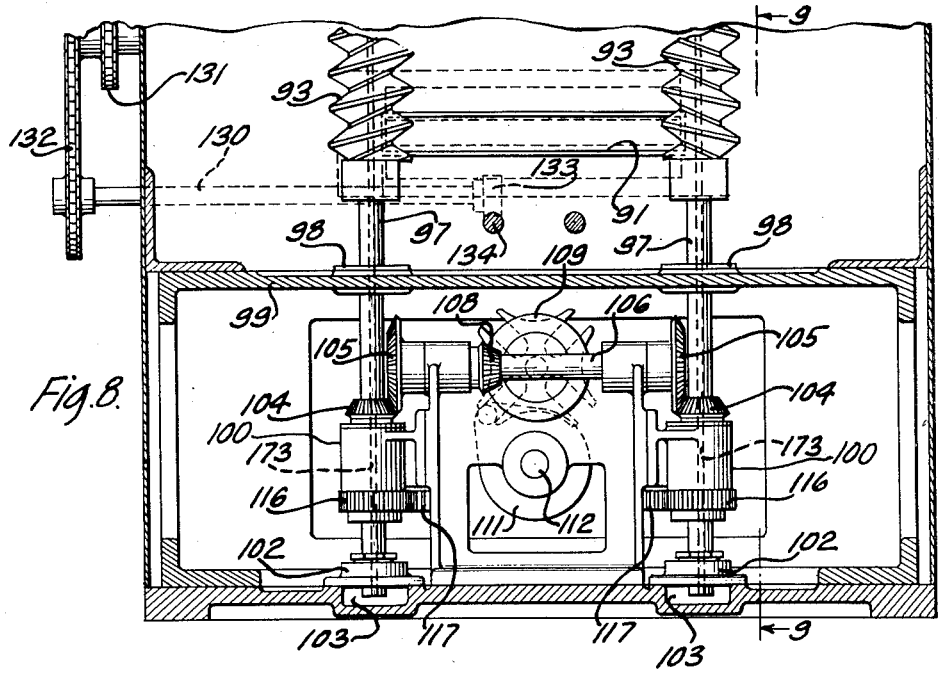
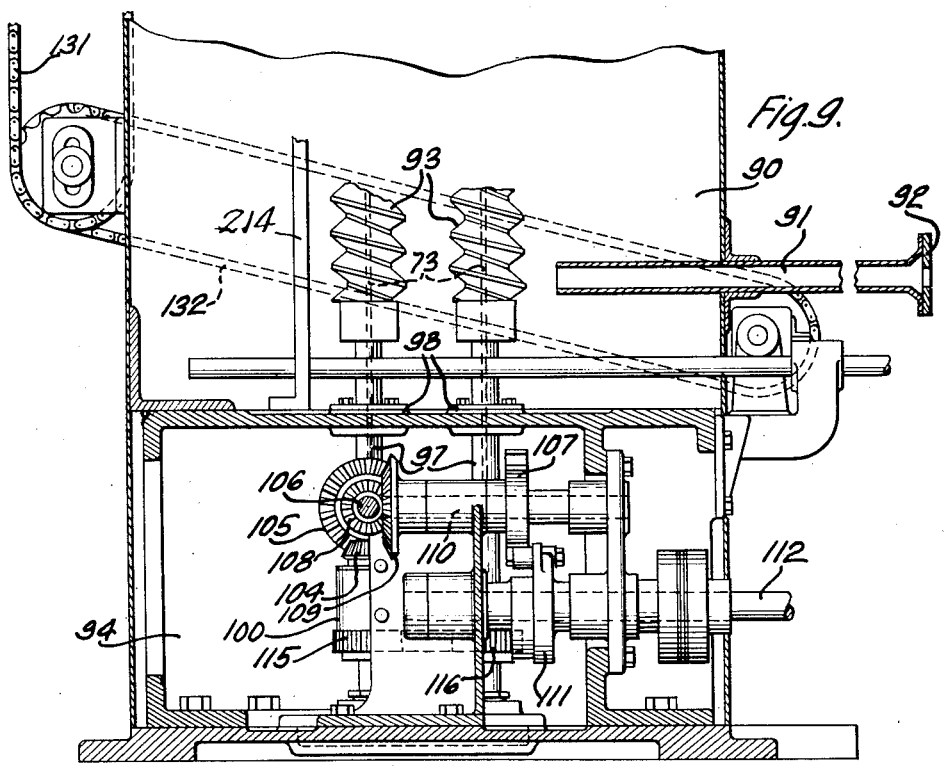
Inventors
B. F. Irwin
H. T. Tornberg
By H. B. Whitfield Atty.

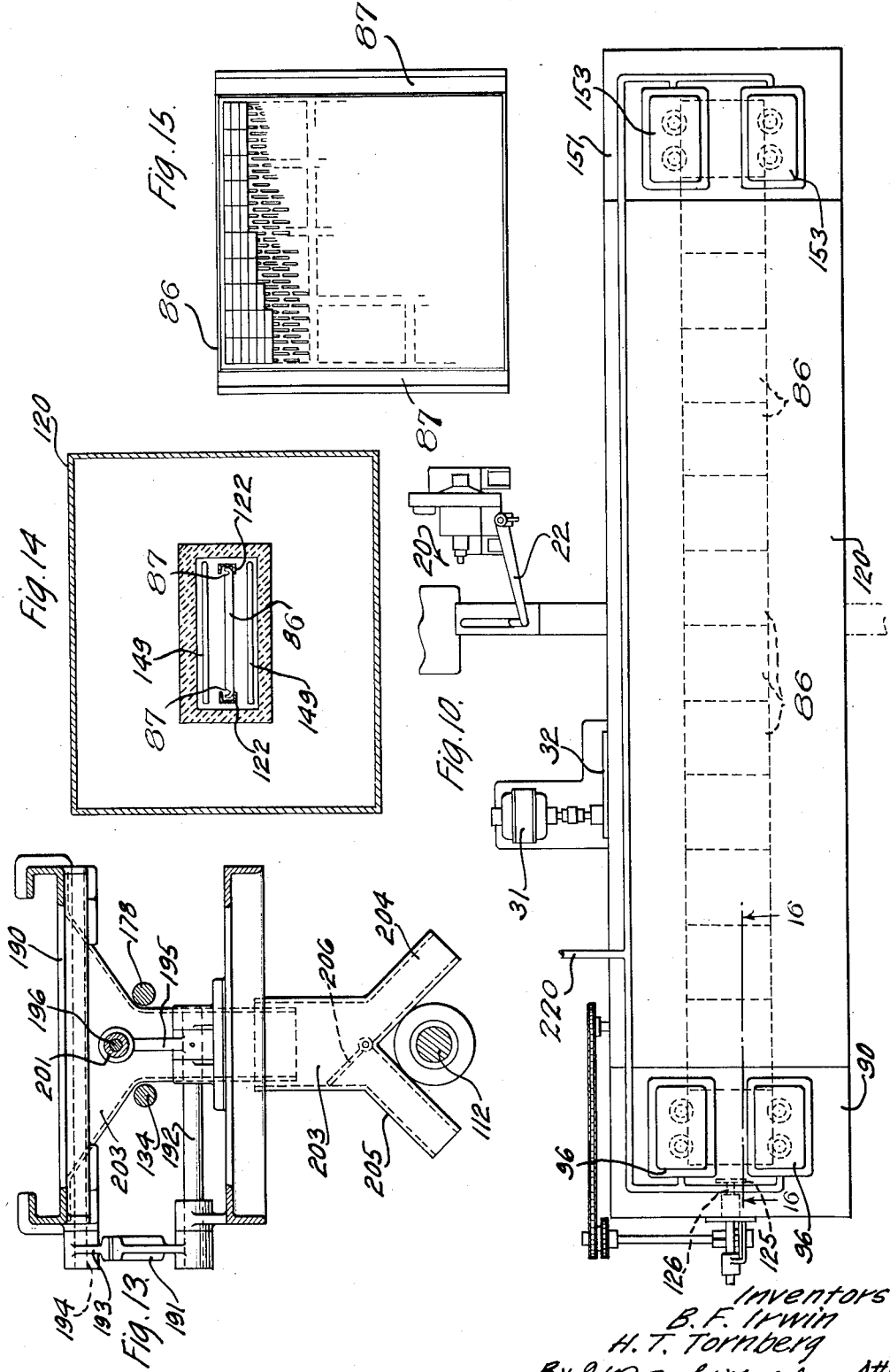

Patented Dec. 12, 1933

1,939,054

UNITED STATES PATENT OFFICE 1,939,054

APPARATUS FOR TREATING ARTICLES

Bernard F. Irwin, Riverside, and Henning T. Tornberg, Chicago, Ill., assignors to Western Electric Company, Incorporated, New York, N. Y., a corporation of New York Application July 21, 1930, Serial No. 469,390
Renewed May 16, 1933

20 Claims. (Cl. 25—142)

This invention relates to an apparatus for treating articles, and more particularly to an apparatus for roasting small carbon shapes.

An object of the invention is to provide an efficient and expeditious apparatus for processing articles.

In one embodiment of the invention carbon blocks which are formed in a molding press, are moved therefrom and onto an endless belt where they are held until a predetermined number of blocks have been disposed in one or a plurality of lines, then the blocks are moved to a tray, which is moved after each supply of blocks is disposed thereupon, until it is filled, and another tray is moved into a receiving position. After each tray is filled with blocks, it is moved toward and into a preheating chamber where it is disposed in parallel spaced positions the preceding trays and the blocks are heated to a predetermined temperature as the trays are moved intermittently through the preheating zone or chamber by a four-screw elevator to a high temperature zone or chamber. The trays are then moved between heating coils of the high temperature zone or chamber where the blocks are roasted, after which the trays carrying the carbon blocks are moved into engagement with another four-screw elevator mechanism which moves the trays downwardly until they are removed successively and passed upon a frame which carries a dumping platform arranged to receive the trays one at a time and move them into a vertical position so that the carbon blocks may be deposited in a chute and directed into receptacles.

Other objects of the invention will be apparent from the following description, taken in connection with the accompanying drawings, wherein Fig. 1 is a front elevational view of the apparatus;

Fig. 2 is a top plan view of a portion of the actuating mechanism of the apparatus shown in operative relation with the punch press;

Fig. 3 is a front elevational view of the mechanism shown in Fig. 2, portions thereof being broken away;

Fig. 4 is an enlarged sectional view taken along the line 4—4 of Fig. 2;

Fig. 5 is an enlarged detailed sectional view taken along the line 5—5 of Fig. 2;

Fig. 6 is a sectional view taken along the line 6—6 of Fig. 2;

Fig. 7 is a sectional view taken substantially along the line 7—7 of Fig. 2;

Fig. 8 is an enlarged sectional view taken substantially along the line 8—8 of Fig. 1;

Fig. 9 is a sectional view taken along the line 9—9 of Fig. 8;

Fig. 10 is a top plan view of the apparatus shown in Fig. 1;

Fig. 13 is a sectional view taken along the line 13—13 of Fig. 2;

Fig. 14 is a sectional view taken along the line 14—14 of Fig. 1;

Fig. 15 is a top plan view of one of the trays, and

Fig. 16 is an enlarged sectional view taken along the line 16—16 of Fig. 10.

Figure 11:
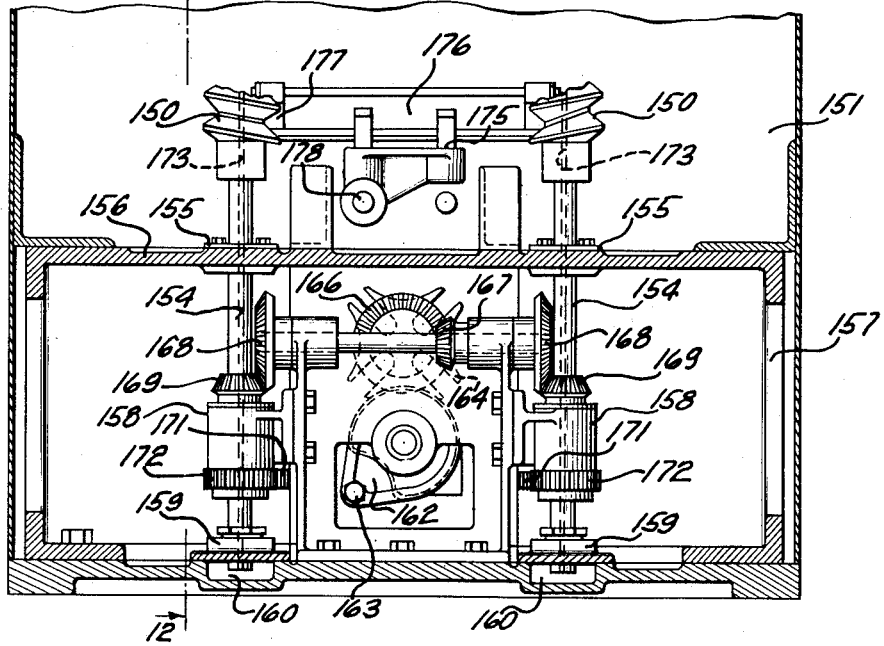
Fig. 11 is an enlarged fragmentary sectional view taken along the line 11—11 of Fig. 1.

Referring now to the drawings wherein like reference numerals designate the same parts throughout the several views, reference numeral 18 indicates a molding press having a three-positioned die set-up over which a reciprocating arm 19 is adapted to be disposed due to its operative connection with the press 18 (Figs. 2 and 5). The operative connection of the arm 19 with the press 18 is effected by a lever arm 20, one end of which is connected to the arm 19 by a link 21, the other end being operatively connected to a drum cam 22 through a cam arm 23. The drum cam 22 is driven by a main drive shaft 24 of the press 18, the connection being made by a gear 25 meshing with a pinion 26 of the main shaft 24. The purpose of the arm 21 is to remove the carbon shapes or blocks from the press and move them onto an endless belt 27 which passes over rollers 28, 29 and 30 (Figs. 5 and 6) and is driven by a motor 31 (Fig. 2) which is operatively connected to the rollers 29 and 30. This operative connection of the motor 31 with the rollers 29 and 30 consists of a speed reducer 32 operatively connected to the motor 31 and having a chain and sprocket connection 33 with a main shaft 34 which is disposed horizontally in a main housing 35 and has its ends rotatably mounted in bearings carried by the housing. Another horizontally disposed shaft 36 is rotatably carried by the housing 35 and is driven continuously, due to a sprocket and chain connection 37 with the shaft 34, and has bevel gears 38 and 39 mounted thereon and meshed with bevel gears 40 and 41, which are fixed to the adjacent ends of pulley shafts 42 and 43, the opposite ends thereof having the pulleys 29 and 30 rigidly mounted thereupon. With this arrangement of mechanism the pulley 30 is rotated in a counterclockwise direction, while the pulley 29 is rotated in a clockwise direction, allowing the pulley 30 to move the belt 27 to convey the carbon shapes from the press 18 positioned at the right (Figs. 5 and 6). If desired, the belt may be extended from the pulley 29 to a pulley 28 of a press positioned at the left (Fig. 6) the pulley 29 driving the belt 27 in this position to convey carbon shapes from the press at the left.

A stacker and dispensing mechanism shown in Figs. 2, 3, 4, and 6 is positioned above the belt 27 and has a receiving member 47 provided with longitudinally extending ribs 48 providing recesses 49 for receiving the carbon shapes as they are moved onto the belt and against a stop member 50 (Fig. 6). The receiving member 47 has rollers 52 mounted at the rear thereof, the forward end thereof being pivotally secured to swinging arms 53 which are mounted upon a horizontal rocker shaft 54. An adjustable stop member 57 is arranged to limit the rearward movement with the receiving member 47 and resilient members 58 are carried by the swinging arms 53 for assuring the positioning of the receiving member 47 adjacent the stop member 57. The pivotal connection of the receiving member 47 with the swinging arms 53 is effected through elongated apertures 59 in the arms 53 to allow the movement of the receiving member 47 to be varied without varying the actuation of the arms 53, the spring 58 compensating for the variation in the movement of the arms 53 and that allowed by the stop member 57 of the receiving member 47. The actuation of the swinging arms 53 is effected by an alternating upward and downward movement of a connection arm 62, the upper end of which is operatively connected with the shaft 54 (Figs. 3, 4, and 6) by a lever 63 and a lower end thereof being pivotally connected to one end of a cam actuated bell crank lever 64. A roller 65 of the bell crank lever 64 is held in engagement with an eccentric cam 66 by a spring 67, the cam being mounted upon a shaft 68 rotatably carried by the housing 35. The shaft 68 has a gear 70 mounted thereupon and in mesh with the gear 71 which is mounted upon the main shaft 34, thus operatively connecting the shaft 68 with the shaft 34 (Fig. 7). Mounted upon the outer end of the shaft 68 is a crank arm 72 which is pivotally connected to one end of a connecting rod 73, the other end thereof being adjustably secured to a pawl 74 which is pivotally secured to one end of a rocker arm 75, at 76, and disposed in operative engagement with a ratchet wheel 77. The rocker arm 75 is pivotally mounted upon a shaft 78, while the sprocket wheel 77 is fixedly mounted thereupon. The shaft 78 extends through the housing 35 and has sprocket wheels 82—82 fixedly mounted thereupon and arranged to receive conveyor chains 83 which also extend over sprocket wheels 84 on a shaft 85, the shaft 85 being disposed in parallel spaced relation with the shaft 78. The purpose of the chains 83 is to impart intermittent movement to trays 86 as each supply of carbon shapes is disposed thereupon, the trays having a multiplicity of staggered elongated slots 87 therein. Engaging lugs 88 are carried by the chains 83—83 for this purpose. As the trays 86 are filled, they are moved upon the angular frame 89 toward a preheating chamber 90 (Fig. 1) due to the abutting engagement of the trays with each other and the movement imparted thereto by the chains 83. The trays 86, when they near the preheating chamber 90, are moved into and through the sealing chamber 91 which extends into the chamber 90 and has an aperture 92 (Fig. 9) in the outer end thereof arranged to receive the trays with the carbon shapes disposed thereupon, the walls of the aperture being in close proximity to the trays and the carbon shapes so as to prevent air passing into the chamber 90. A four-screw elevator 93 is disposed in the chamber 90, the screws thereof being positioned so that the trays with the carbon shapes may be disposed in engagement therewith, a pair of the screws engaging each end of the trays at spaced positions (Figs. 8 and 9). An intermittent rotary motion is imparted to the screws simultaneously to move the trays upwardly during each intermittent motion and to allow another tray of carbon shapes to be moved into engagement with the screws of the elevator after each intermittent motion thereof. The intermittent motion is imparted to the screws of the elevator 93 by mechanism disposed in a casing 94 beneath the chamber 90. The screws of the elevator 93 have shaft portions 95 which are journaled in bearings in sealed casings 96 (Figs. 1 and 10). The lower ends of the screws of the elevator 93 have shaft portions 97 which extend through packing glands 98 in a wall 99 of the casing 94 are journaled in bearings 100 and have their lower ends disposed in packing glands 102 and extending into liquid receiving compartments 103—103. Two of the shaft portions 97 have pinions 104 fixed thereto and in mesh with bevel gears 105 which are rigidly mounted upon each end of a shaft 106. An operative engagement is had between a shaft 106 and a Geneva movement mechanism 107 by a pinion 108 of the shaft 106 meshing with a bevel gear 109 which is fixed to a shaft 110 upon which the Geneva gear is mounted. The Geneva mechanism 107 receives its movement from the continuous rotation of an arm 111 which is fixed to a shaft 112 operatively connected to the main shaft 34 (Fig. 7) by a worm gear 113 and a worm 114. This mechanism provides a simultaneously intermittent movement of the two screws of the elevator 93 shown in Fig. 8, and in order to provide a simultaneous intermittent movement to the other two screws of the elevator 93, the driven screws have gears 115 which are operatively connected with gears 116 mounted upon their adjacent screw members by idlers 117.

As the trays with the carbon shapes thereupon are moved upwardly into the chamber 90, they are heated to a predetermined temperature by a heating passage 119, thus preparing the carbon shapes for a high temperature chamber 120, into which the trays with the carbon shapes are passed when they reach the upper end of the elevator 93. When the trays with the carbon shapes reach a predetermined position at the upper end of the elevator 93, an ejecting mechanism 121 (Figs. 1, 8, 9, and 10) is actuated to push the topmost tray through a sealing chamber 122 past baffle doors 123 positioned at each end thereof and onto spaced channel shaped frame members 124 extending longitudinally through the high temperature chamber 120.

The ejecting mechanism 121 consists of a tray-engaging member 125 which is mounted upon the inner end of a rack 126, the latter being movably carried by a bracket 127 and having its teeth meshed with a gear 128. The gear 128 is fixedly mounted upon one end of a shaft 129, which is operatively connected to a shaft 130 by sprocket and chain connections 131 and 132, the shaft 130 having a gear 133 (Fig. 8) mounted upon its inner end and in mesh with a longitudinally moving rack 134. A back and forth movement is imparted to the rack 134 by an alternating clockwise and counterclockwise movement of a gear 135. This movemnt is imparted to the gear 135 by an oscillating segment 140, the teeth of which are in mesh with a relatively small gear 141 fixed to the gear 135. The lower end of the segment 140 is pivotally mounted upon a shaft 142 held by a bearing bracket 143 and has a cam roller 144 rotatably mounted adjacent the center of the arm of the segment 140 and receivable in a groove 145 of a drum cam 146, the latter being mounted upon the shaft 112 and continuously rotated thereby. As the trays 86 are removed from the elevator 93 and onto the frame members 122, they are moved between heating units 149 (Fig. 14) in the high temperature chamber 120 and are intermittently advanced to the right extremity of the chamber 120, where another four-screw elevator is disposed to receive the trays with the carbon shapes and lower them to a position in alignment with the frame members 89.

The elevator at the right of the high temperature chamber 120 indicated generally at 150, which is disposed in a cooling zone or chamber 151 is substantially identical in construction to the elevator 93, and is controlled by a similar mechanism. The four-screws of the elevator 150 have shaft portions 152 at the upper ends thereof which are journaled in bearings positioned in liquid receiving chambers 153. The lower ends of the screws of the elevator 150 have shafts 154 which extend through packing glands 155 in a wall 156 of a casing 157, through bearings 158 and have their lower ends journaled in packing glands 159 and extending into liquid receiving chambers 160. The mechanism is disposed in the casing 157 for imparting intermittent rotary movement to the screws of the elevator 150 and is operatively connected to the shaft 112. By viewing Figs. 11 and 12, it will be observed that an arm 162 is mounted upon the end of the shaft 112 within the casing 157 and has a roller 163 arranged to operatively engage a Geneva gear 164 which is fixed to a shaft 165 that is rotatably mounted in the casing 157. At one end of shaft 164 a bevel gear 166 is disposed and is in mesh with a pinion 167 which is mounted upon a horizontal shaft positioned between two of the shafts 154 and operatively connected thereto by bevel gears 168 which are mounted upon the ends thereof and meshing with pinions 169 of the shafts 154 (Fig. 11). The shafts 154 shown in Fig. 11 are operatively connected to their adjacent shafts by gears 170 meshing with idlers 171 which mesh with gears 172 of the adjacent shafts.

A cooling means is provided for the elevators 93 and 150 which consists of a liquid supply line 220 for directing a liquid such as water or oil into the cooling chambers 96 and 153; this liquid being forced through hollow passageways 173 in the screws of the elevators 93 and 150 into the cooling compartments 103 and 159, the liquid being exhausted from these compartments. A cooling unit, such as a water-jacket 174 is disposed around the elevator 150 adjacent the loading position for cooling the trays 87 and carbon shapes as they move downwardly in the cooling zone or chamber 151.

When the trays carrying the carbon shapes are lowered to a predetermined position, an ejector member 175 is moved to the left (Fig. 12) to remove the lowermost tray from the elevator 151 and move it past a pivotal sealing door 176 and into an outlet compartment 177. The member 175 is carried by a rod 178 which is slidable in bearings 179 and extends over a gear 182 which is rotatably mounted in a housing 35 and in mesh with a toothed portion 183 formed in the lower surface of the rod 178. A relatively small gear 184 is fixed to the gear 182 and is in mesh with an oscillating segment 185, the lower end of which is pivotally mounted upon the shaft 152 and is provided at substantially the center thereof with a cam roller 186 receivable in the groove 145 of the drum cam 146 (Figs. 3 and 6).

Figure 12:
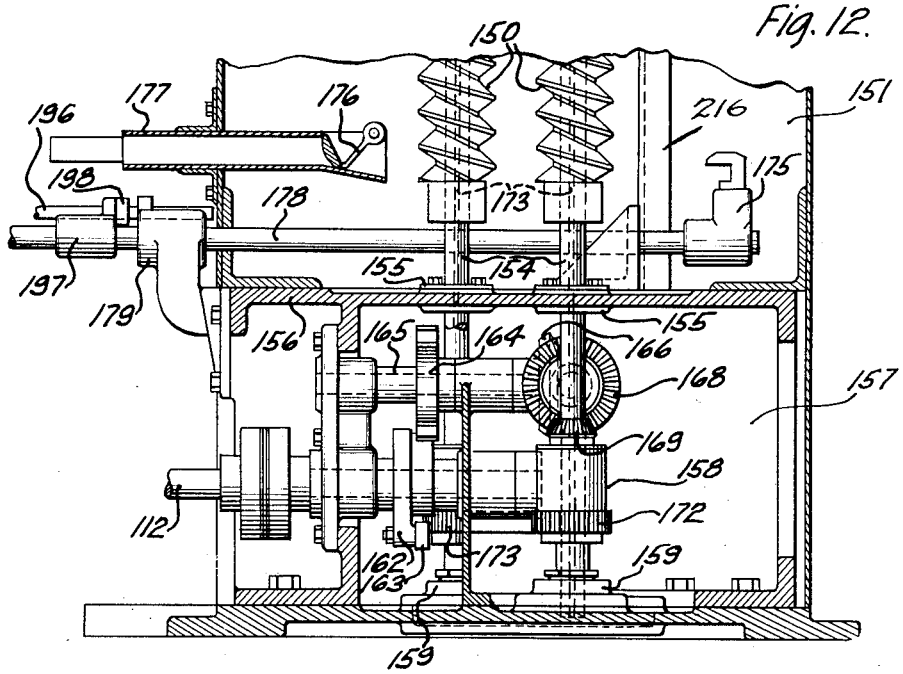
Fig. 12 is a fragmentary sectional view taken substantially along the line 12—12 of Fig. 11.

As additional trays are removed from the elevator 151, the previously removed trays are advanced through the outlet compartment 177 on to the frame members 89 and at each advancement of the trays from the elevator 151 a tray is moved onto a dumping platform 190. The tray that is moved upon the dumping platform 190 is tilted past a vertical position by a movement of the platform caused by the actuation of a dumping mechanism effected by a return movement of the mechanism 175. The operative connection between the dumping platform 190 and the ejector 175 consists of a gear segment 191 having one end fixed to a pivotal shaft 192 and the toothed end disposed in mesh with teeth of a quadrant 193, the quadrant being fixed to a shaft 194 to which the platform 190 is pivotally secured (Figs. 2 and 3). A lever 195 has one end fixed to the shaft 192, and the other end operatively connected to one end of the rod 196, the other end of which extends through an aperture in a bracket 197 and provided with a collar 198 which is secured thereto (Fig. 12). The rod 196 (Fig. 3) extends through an aperture in a frame 200 and has a sleeve 201 disposed concentric relative thereto adjacent the frame 200. A compression spring 202 is disposed concentric with the rod 196 between the sleeve 201 and the lever 195 for a purpose hereinafter described.

A chute 203 is positioned in front of the dumping platform 190 for receiving the carbon shapes as they are dumped from the trays. The lower portion of the chute indicated at 203 has forked members 204 and 205 for directing the carbon shapes into pans disposed therebeneath as controlled by a shutter 206.

From the foregoing description of the various parts of the apparatus, the operation thereof will be more clearly understood. It is assumed that the operation of the molding press 18 is understood, the method of which the carbon shapes are formed being immaterial insofar as the present invention is concerned. In order that the arm 21 may be actuated in timed relation with the operation of the press so that the apertures therein will be in general alignment with the die openings while the punch is moved downwardly, the arm is moved by the operative connection with the drum cam 24 so as to move the carbon shapes upon the belt 27 while the punch is moved upwardly. In the present disclosure three carbon shapes are formed at each actuation of the punch and these carbon shapes are moved forwardly upon the belt 27 until they are positioned within the recesses 49 of the receiving member 47. The stop member 50 limits the movement of the carbon shapes and after a predetermined number of carbon shapes have been disposed in the recesses 49 upon the belt 27, the arms 53 of the stacker and dispensing mechanism (Fig. 4) is actuated by the cam 66 moving the bell crank lever 64 to move the connecting arm 62 downwardly and swing the arms 53 outwardly into the dotted line position (Fig. 4). As the arms 53 begin their movement outwardly, a shutter 210, which is held upwardly by the arms 53, is allowed to move downwardly to a position adjacent the belt 27, thus preventing additional carbon shapes from passing into the recesses 49, and by further movement of the arms 55 outwardly the receiving member 47 is moved forwardly, the rear end thereof being supported by the rollers 52, while a pusher member 211, which is pivotally carried by the receiving member 47, is moved forwardly, thus pushing the carbon shapes off the belt 27, down a slide 212, and onto the adjacent tray 86. The trays 86 are moved forwardly a predetermined distance on the actuation of the sprocket 77 and the chains 83, each of the small notches of the sprocket being of sufficient depth to move the tray the distance of three carbon shapes. When one tray is filled, it is moved forwardly a desired distance and another tray is moved in place to receive the carbon shapes. This additional or faster movement of the trays is made effective by the relatively long teeth 213 of the sprocket 77. The returning of the stacker and dispensing mechanism to the normal position; that is, the position shown in solid line (Fig. 4), causes one of the arms 53, which is arranged to engage the shutter 210 to move the shutter upwardly and allow an additional supply of carbon shapes to be moved into the recess 49. The position of the receiving member 47 relative to the belt 27, may be varied by the adjusting stop member 57.

The trays of the carbon shapes are then moved toward the preheating chamber 90 where they are moved into engagement with elevator 93 after each intermittent motion of the elevator. Corresponding grooves in the screws of the elevator 93 will be arranged to receive the next tray and as shown in Fig. 8 the right and left screws have left-hand and right-hand threads, respectively, their adjacent driven screws being of like formation. The intermittent rotation of the screws of the elevator 93 imparts an intermittent upward movement of the trays, allowing space after each intermittent movement for another tray to be placed upon the elevator, and any lateral movemen of the trays is toward a guide or abutment member 214, Fig. 9. A latch 215, which is mounted upon the rack 134 (Fig. 3), advances the trays during the movement of the rack to the left so as to move the foremost tray onto the elevator 93 while the elevator is at rest. During the upward movement of the trays in the chamber 90 the carbon shapes carried thereby are heated to a temperature ranging from 450° F. to 600° F., and when the trays reach a predetermined position; that is, a position in alignment with the frame members 122 (Fig. 1) after a travel of approximately one and one-half hours, the topmost tray is removed from the elevator 93, while a tray is placed in the lowermost position upon the elevator. This placing of a tray upon the elevator at the bottom thereof and removing of a tray from the elevator at the top thereof is effected by the actuation of the ejecting mechanism caused by the movement of the segment 140, the rocking of the gears 141 and 135, the longitudinal movement of the rack 134 with the latch 215 (Fig. 3), the actuation of the sprocket and chain connections 131 and 132 and the inward movement of the ejector mechanism 121.

The trays 86 are moved directly from the preheating zone through the sealing chamber 122 and into the high temperature zone and as they are advanced between the heating units 149 the carbon shapes carried thereby are heated to a red heat, during the time of approximately twenty minutes in which the trays pass through this zone, the zone being heated to approximately 1600° F., and as a result the carbonous material passing off a gas, which, if mixed with air, would create combustion. As pointed out in the foregoing, the sealing chamber 91, and the outlet compartment 177 with the sealing door 176 are to prevent the admission of air into the preheating zone and the cooling zone, and, due to the pressure of the gas in the zones, this result is effected. To allow for the excess gas in the zones to escape, a flue 220 is disposed in communication with the zone 120 and is provided with a check valve 221 for varying the amount of gas escaping therefrom.

The actuation of the ejector mechanism 121 moves the trays intermittently through the high temperature zone, placing the farthest tray, during each movement, upon the elevator 150 which moves the trays intermittently through the cooling unit 174 and the cooling compartment thus cooling the carbon shapes from the temperature of approximately 1600° F. when removed from the high temperature zone, to a temperature of approximately 100° F. before the trays are ejected from the cooling compartment 151. The arrangement of the screws of the elevator 150 are such that corresponding grooves therein will be positioned to receive a tray from the frame 122 of the high temperature zone after each intermittent movement thereof, the right and left screws as shown in Fig. 11 with their adjacent screws having right-hand and left-hand threads respectively, to impart a downward movement to the trays which are held against lateral displacement by a guide or abutment member 216 (Fig. 12).

The ejector 175 at its operative engagement with the dumping platform 190 removes the trays from the elevator 151, advances a tray upon the dumping platform 190 during the movement to the left (Figs. 3 and 12) and during the return movement to the right, the mechanism (Fig. 3) for swinging the platform 190 into dumping position is actuated against the tension of the spring 202. There is sufficient movement of the ejector 175 toward the left to allow the spring 202 to move the platform 190 beyond dead center and to allow the platform to move downwardly to the horizontal position before another tray is moved thereupon.

From this disclosure, it is obvious that the entire mechanism is automatic in its operation from the removal of the carbon shapes from the press to the placing of the carbon shapes upon the trays, the lifting of the trays by the elevator 93 to the position where they are automatically moved on the frames 122 and passed between the heating units 149 and onto the elevator 150 where they are lowered into alignment with the frames 89 and advanced to the dumping platform where they are moved into a position to allow the carbon shapes to drop therefrom into the chute 203, and are again moved forwardly to receive another supply of carbon shapes, thus providing a continuous circuit for the trays 86 in order to receive a continuous supply of carbon shapes and move them to the preheating chamber 90, the high temperature chamber 120 where they are roasted, and to the atmosphere through the cooling chamber 151 (Figs. 1, 10, 11 and 12). Furthermore, with the apparatus so constructed, the carbon shapes may be removed from a press disposed upon either side thereof. In the present disclosure, the press employed is shown positioned at one side of the apparatus (Fig. 2), but it should be understood that a press positioned upon the opposite side of the apparatus could be employed in connection therewith. In the present instance, the belt 27 is being driven by the pulley 30, but if the press upon the opposite side of the apparatus is to be employed, the belt 27 will be removed from the pulley 28 of the press shown and extended from the pulley 29 to the opposite press. Then by reversing the positions of the shutter 210 and the stop member 50, the apparatus is ready to receive the carbon shapes as they are moved by the belt which is driven by the pulley 29.

What is claimed is:

1. The combination with a molding press for molding carbon shapes, of means for removing the carbon shapes from the press, means for retaining the carbon shapes until a predetermined number have been removed from the press, a tray, and means for depositing the predetermined number of carbon shapes upon said tray.

2. The combination with a molding press for molding carbon shapes, of means for removing the carbon shapes from the press, a high temperature chamber, means for moving the carbon shapes through said high temperature chamber, a cooling chamber, means for moving the carbon shapes through said cooling chamber, means for removing the carbon shapes from said cooling chamber, and means for ejecting the carbon shapes.

3. The combination with a molding press for molding carbon shapes, of a moving member, means for moving the carbon shapes from the press onto said moving member, a receiving member disposed in close proximity with said moving means, means for retaining a predetermined number of the carbon shapes in said receiving means, and means for actuating said receiving means when a predetermined number of carbon shapes have been disposed therein for removing the carbon shapes from said moving member.

4. The combination with a molding press for molding carbon shapes, of a moving member, means for moving the carbon shapes from the press onto said moving member, a receiving member disposed in close proximity with said moving means, means for retaining a predetermined number of the carbon shapes in said receiving means, means for actuating said receiving means when a predetermined number of carbon shapes have been disposed therein for moving the carbon shapes from said moving member, and means for checking the movement of the carbon shapes upon said moving member during the actuation of said receiving member.

5. The combination with a molding press for molding carbon shapes, of a moving member, means for moving the carbon shapes from the press onto said moving member, a receiving member disposed in close proximity with said moving means, means for retaining a predetermined number of the carbon shapes in said receiving means, means for actuating said receiving means when a predetermined number of carbon shapes have been disposed therein for moving the carbon shapes from said moving member, a tray for receiving the carbon shapes from said moving member, and means for advancing said tray after each predetermined number of carbon shapes is removed from said moving member.

6. The combination with a molding press for molding carbon shapes, of a moving member, means for moving the carbon shapes from the press onto said moving member, a receiving member disposed in close proximity with said moving member, means for retaining a predetermined number of the carbon shapes in said receiving means, means for actuating said receiving means when a predetermined number of carbon shapes have been disposed therein for moving the carbon shapes from said moving member, a tray for receiving the carbon shapes from said moving member, means for advancing said tray after each predetermined number of carbon shapes is removed from said moving member, a high temperature chamber, and means for advancing said tray with the carbon shapes disposed thereupon through said high temperature chamber.

7. In an apparatus for treating articles, trays for receiving the articles, a preheating chamber, means for moving the trays with the articles into said preheating chamber, elevating means disposed in said preheating chamber for moving the trays with the articles through said preheating chamber, a high temperature chamber, and means cooperating with said first named tray moving means for moving the trays with the articles into said high temperature chamber.

8. In an apparatus for treating articles, trays for receiving the articles, a preheating chamber, means for moving said trays with the articles into said preheating chamber, means for moving said trays with said articles through said preheating chamber, a high temperature chamber, means for moving the trays from said preheating chamber into said high temperature chamber, a cooling compartment, means disposed in said cooling compartment for receiving the trays with the articles from said high temperature compartment and advancing the trays in said cooling compartment, means for removing the trays from said cooling compartment, and means for tilting the trays for dumping the articles therefrom.

9. In an apparatus for treating articles, trays for receiving the articles, a preheating chamber, means for moving said trays with the articles into said preheating chamber, means for moving said trays with said articles through said preheating chamber, a high temperature chamber, means for moving the trays from said preheating chamber into said high temperature chamber, a cooling chamber, means disposed in said cooling chamber for receiving the trays with the articles from said high temperature chamber and advancing the trays in said cooling chamber, means for removing the trays from said cooling chamber, and means cooperating with said tray removing means for tilting the trays for discharging the articles therefrom.

10. In an apparatus for heating articles, a high temperature chamber, elevating means for moving the articles toward said high temperature chamber, means for removing the articles from said elevating means and moving the articles into said high temperature chamber, and means for cooling the elevating means.

11. In an apparatus for heating articles, trays for receiving the articles, means for elevating the trays, means for imparting intermittent motion to said elevating means, means for moving the trays with the articles into engagement with said elevating means while said elevating means is at rest, and means for removing said trays from said elevating mechanism.

12. In an apparatus for treating articles, trays for receiving the articles, a preheating chamber, an elevator disposed in said preheating chamber, means for moving said trays with the articles onto said elevator, said elevator comprising a plurality of spiral screw members for engaging the trays at spaced positions, and means for imparting an intermittent rotary motion to said screw members simultaneously for moving said trays with the articles through said preheating chamber.

13. In an apparatus for treating articles, means for removing articles to be treated from a press, means for receiving the articles removed from the press, means for disposing the articles upon a tray, and means whereby articles may be removed from a second press, the operative connection with the first named press being made ineffective.

14. In an apparatus for treating articles, a conveyor, means whereby said conveyor may be operatively connected to a press for removing articles to be treated from a press, a receiving member for receiving the articles from the press, a stop member for stopping the articles against movement relative to said conveyor in said receiving member, a shutter for cutting off a supply of articles to said receiving member, means whereby said conveyor when removed from said first named press may be operatively connected to a second press, and means whereby said stop member and said shutter may be arranged to stop the movement of the articles received from said second named press in said receiving member, and cutting off the supply of articles from said second named press to said receiving member respectively.

15. The combination with a molding press for molding articles, of means for conveying the articles from the press, and a reciprocating member movable between the press and said conveying means for moving the article from the press upon said conveying means.

16. The combination with a molding press for molding articles, of means for conveying the articles from the press, an article moving member, and means for imparting intermittent movement to said article moving member whereby said article moving member may be moved into registration with the press, held at rest until the articles are molded, and moved toward said conveying means to move the molded articles thereupon.

17. The combination with a molding press for molding articles, of means for conveying the articles from the press, an article moving member, and means for imparting intermittent movement to said article moving member whereby said article moving member may be moved into registration with the press, held at rest until the articles are molded, moved toward said conveying means to move the molded articles thereupon, and moved again into registration with the press before the next molding operation.

18. In an apparatus for treating articles, trays for receiving the articles, means for moving the trays horizontally into a heating unit, a heating unit for heating the articles, an elevating means consisting of spiral members for engaging the trays at spaced positions relative to the trays, means for actuating said spiral members intermittently for imparting an intermittent movement to the trays through said heating unit, and means actuated, when said spiral members are at rest, for moving the trays into registration with said spiral members.

19. In an apparatus for treating articles, trays for receiving articles, a preheating chamber, a high temperature chamber, a cooling chamber, means disposed in said chambers whereby said trays may be moved therethrough, and means for simultaneously moving a tray into said preheating chamber, moving a tray from said preheating chamber into said high temperature chamber, moving a tray from said high temperature chamber into said cooling chamber, and moving a tray from said cooling chamber.

20. An apparatus for treating articles, comprising a preheating chamber, a high temperature chamber, a cooling chamber, a plurality of trays for receiving the articles, and means for successively advancing the trays through said chambers.

BERNARD F. IRWIN.
HENNING T. TORNBERG.